June 4, 1929.  L. TADDEO  1,715,796
EQUALIZING DEVICE FOR BRAKES
Filed Oct. 7, 1927  2 Sheets-Sheet 1
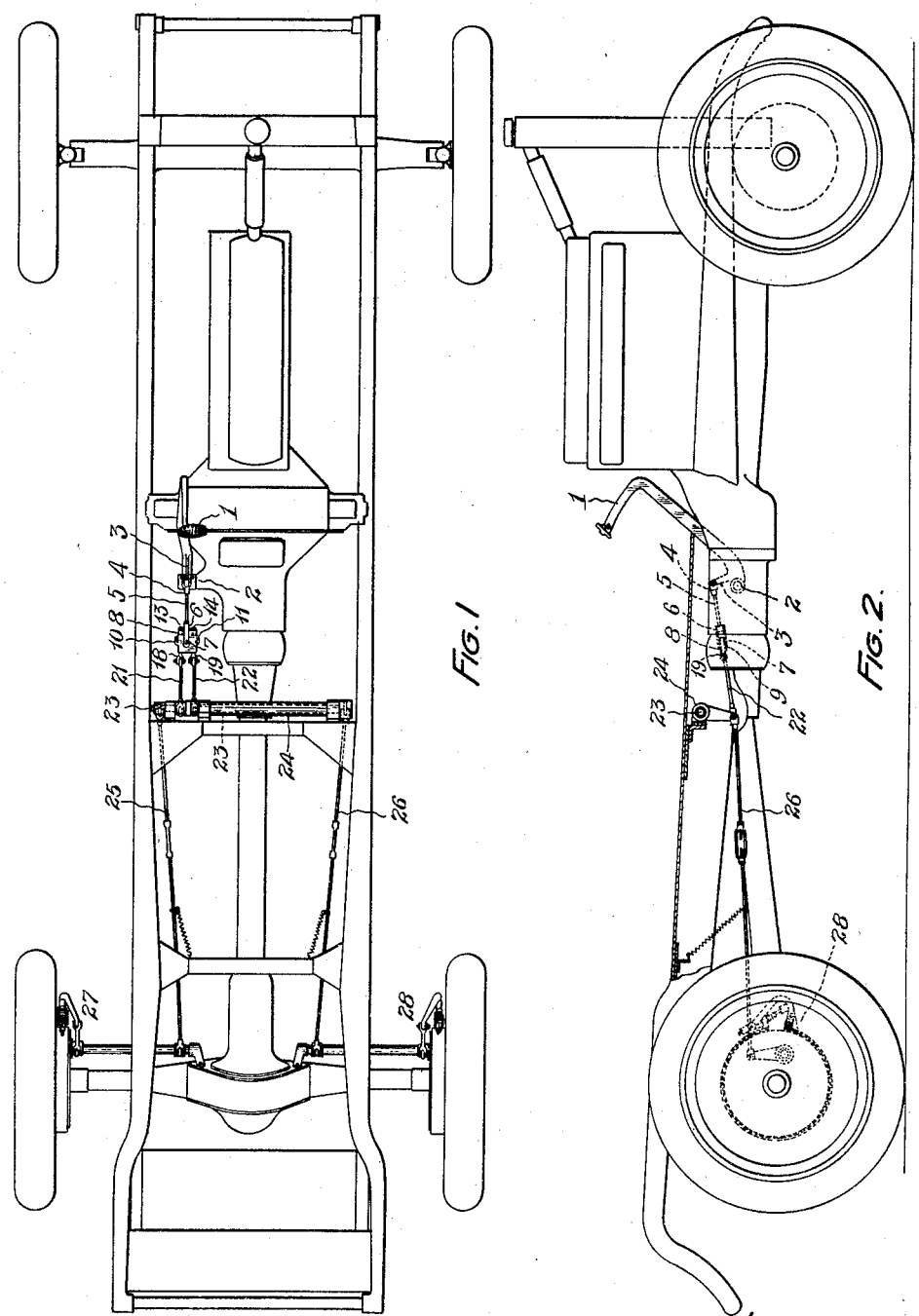
INVENTOR:
LUIGI TADDEO
BY
George W. Saywell
ATTORNEY.

June 4, 1929.  L. TADDEO  1,715,796

EQUALIZING DEVICE FOR BRAKES

Filed Oct. 7, 1927  2 Sheets-Sheet 2

INVENTOR:
LUIGI TADDEO
BY George W. Saywell
ATTORNEY.

Patented June 4, 1929.

1,715,796

UNITED STATES PATENT OFFICE.

LUIGI TADDEO, OF CLEVELAND, OHIO.

EQUALIZING DEVICE FOR BRAKES.

Application filed October 7, 1927. Serial No. 224,696.

My invention particularly relates to devices of the character noted in which an intermediate floating member comprised of relatively movable parts is adapted to compensate for or equalize the differential between the various reactive stresses respectively exerted by a plurality of braking members when said members are worn in different amounts or for other reasons react in different degrees to the same braking force.

The invention is particularly illustrated in the accompanying drawings in connection with a pair of brake devices applied to the rear wheels of an automobile.

The annexed drawings and the following description set forth in detail certain means illustrating my invention, such disclosed means constituting, however, but one of the various forms in which the principle of the invention may be embodied.

In said annexed drawings:

Figure 1 is a plan view of an automobile chassis showing my improved equalizing device applied to the two rear wheel brakes;

Figure 2 is a side elevation of the elements shown in Figure 1;

Figure 3:
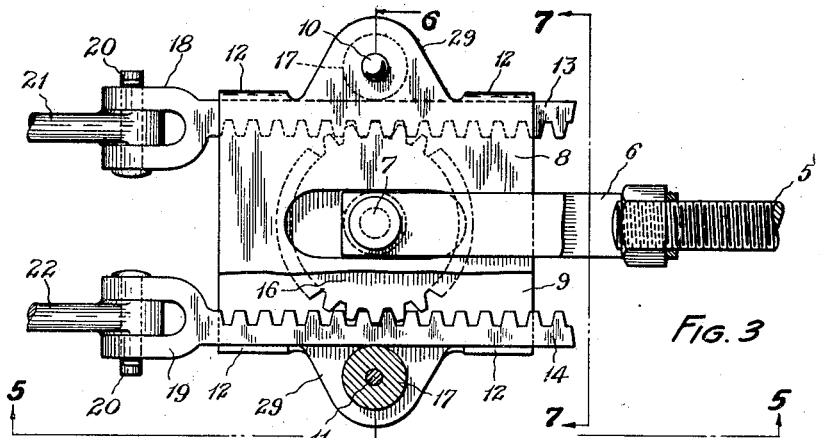
Figure 3 is a plan view, upon an enlarged scale, of the equalizing device proper, parts being shown in plan section; also showing fragmentary portions of coupling members adapted to connect the equalizing device to the means by which braking action is applied and to the several braking members proper, this view showing the equalizing device in released position.
Figure 4:
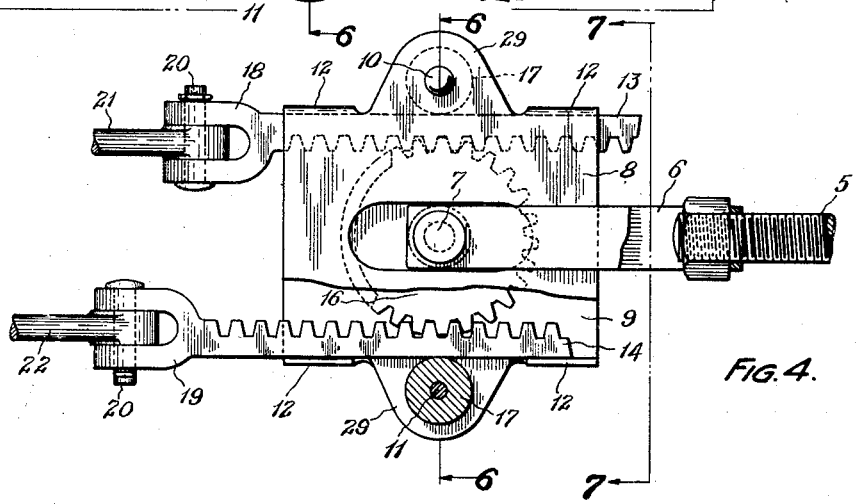
Figure 4 is a plan view similar to Figure 3, but showing the position of the several parts of the equalizing device when a braking force is applied thereto and acts upon two brakes in different conditions, one of the brakes, for instance, being worn more than the other.
Figure 5:
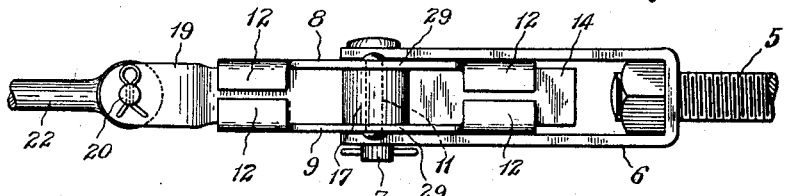
Figures 6, 7:
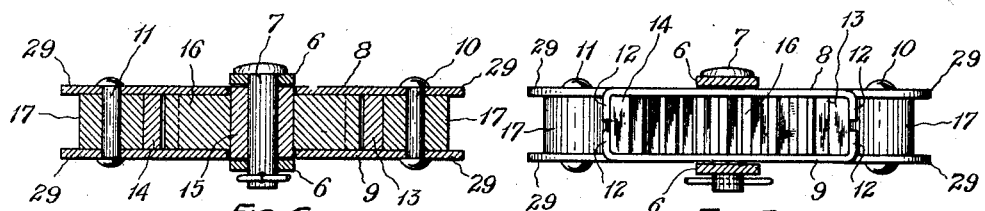

Figure 5 is a side elevation of the members shown in Figures 3 and 4, taken from the plane indicated by line 5—5, Figure 3; and Figures 6 and 7 represent vertical cross sections, taken respectively in the planes indicated by lines 6—6 and 7—7, Figures 3 and 4.

Referring to the annexed drawings in which the same parts are indicated by the same respective ordinals in the different views, a service brake lever 1 of an automobile is rotatably mounted upon the pin 2 and has an upwardly-extended arm 3 connected to a yoke member 4 secured to one end of a bolt 5. By the means described, the braking action is applied to my improved equalizing device which is adjustably connected to the other end of the bolt 5 by means of a yoke member 6, whose two side members are mounted at their ends upon a pin 7 which intersects the central parts of the side walls 8 and 9 of a housing member forming means for holding together the relatively movable parts of the equalizing device which will now be described.

The two side faces 8 and 9 of the housing are further secured together adjacent their edges by rivets 10 and 11 upon which are mounted roller bearings 17, as plainly shown in Figure 6, the walls 8 and 9 being formed with respective pairs of oppositely-disposed outwardly-projecting ears 29 receiving the rivets 10 and 11. The side faces 8 and 9 of the housing are formed with pairs of oppositely-disposed side flanges 12 turned at right angles to the faces 8 and 9 proper and forming holding means for the outer smooth faces of a pair of rack members 13 and 14 whose rack portions are inwardly-disposed and whose outer face portions freely slide upon the inside faces of the flanges 12, as plainly shown in Figure 4. Upon the central pin 7 is mounted a roller bearing 15 and upon this bearing is mounted a pinion 16 whose side faces lie in planes parallel with the faces 8 and 9 of the housing and which engages the oppositely-disposed racks 13 and 14. These rack members 13 and 14 are provided with coupling members 18 and 19 by means of which they may be secured by pins 20 to links 21 and 22, Figure 1. The intermediate portions of the outer smooth side faces of the racks 13 and 14 roll upon the pair of bearings 17 mounted upon the rivets 10 and 11. Any dirt, dust, or other obstruction, or moisture, which blows in or creeps along the outer smooth end face portions of the racks 13 and 14 and the side flanges 12 escapes from the casing or is worked out therefrom between the ears 29 upon which the roller bearings 17 are mounted. The aforementioned links 21 and 22 are secured respectively to a shaft 23 and a surrounding shell or bushing member 24 supported upon the automobile chassis. The shaft 23 through the medium of a link 25 is connected to the braking device 27 of one of the automobile rear wheels and the surrounding sleeve 24 is connected by a link 26 to the braking device 28 of the oppositely-disposed automobile wheel.

It will be evident from the aforegoing description and the accompanying drawings that, if a braking force is applied to the pedal 1, it will pull the housing 8—9 and the pinion 16 towards the front of the automobile, the engagement of the pinion 16 with the rack members 13 and 14 also tending to pull the rack members forwardly and to apply the braking devices 27 and 28. These braking devices will be moved to an extent inversely proportional to the amount of the reactive stresses set up by the several braking devices. These stresses may vary for several reasons due to the different conditions of the two braking devices; for instance, one of the brakes may be worn more than the other. This differential between the reactive stresses of the several braking devices is compensated for or equalized by the relative movements of the two rack members 13 and 14 which, as will be readily understood, will be pulled forwardly distances inversely proportionate to these various stresses, the different amounts of movement of the rack members 13 and 14 being permitted by the rolling of the pinion 16 forwardly relatively to that rack which resists the braking action to a greater extent, resulting in a forward movement of the other rack to an extent greater than it would have been moved by the same braking force, if both wheel-braking devices had resisted to the same extent.

What I claim is:

1. A floating equalizing brake unit comprising, a housing; a pin intersecting the side faces thereof; a roller bearing mounted upon said pin; a pinion mounted upon said bearing; oppositely disposed rack members engaging said pinion; two pairs of oppositely-disposed housing ears projected outwardly from the bottom and top walls of said housing; a pair of roller bearings mounted in said ears and engaging the outside face portions of said rack members, respectively; a U-shaped coupling member secured to said pin; and coupling members secured to said rack members, respectively.

2. A floating equalizing brake unit comprising, a housing; a pin intersecting the side faces thereof; a roller bearing mounted upon said pin; a pinion mounted upon said bearing; oppositely disposed rack members engaging said pinion, the outside faces of said rack members being smooth and adapted to slide upon the inner bottom and top surfaces of said housing; two pairs of oppositely disposed housing ears projected outwardly from the top and bottom walls of said housing; a pair of pins rigidly mounted in said pairs of ears, respectively; a pair of roller bearings mounted upon said pins and engaging the smooth outside face portions of said rack members, respectively; a U-shaped coupling member secured to said first-mentioned pin; and coupling members secured to said rack members, respectively.

Signed by me this 3rd day of October, 1927.

LUIGI TADDEO.